Feb. 5, 1952

L. K. CLARK 2,584,789

AUTOMATIC CLAMPING DEVICE

Filed March 7, 1950

INVENTOR
LLOYD K. CLARK
BY
J. W. Armbruster
ATTORNEY

Feb. 5, 1952 L. K. CLARK 2,584,789
AUTOMATIC CLAMPING DEVICE
Filed March 7, 1950 5 Sheets-Sheet 3

INVENTOR
LLOYD K. CLARK
BY
J W Armbruster
ATTORNEY

INVENTOR
LLOYD K. CLARK
BY
J.W. Armbruster
ATTORNEY

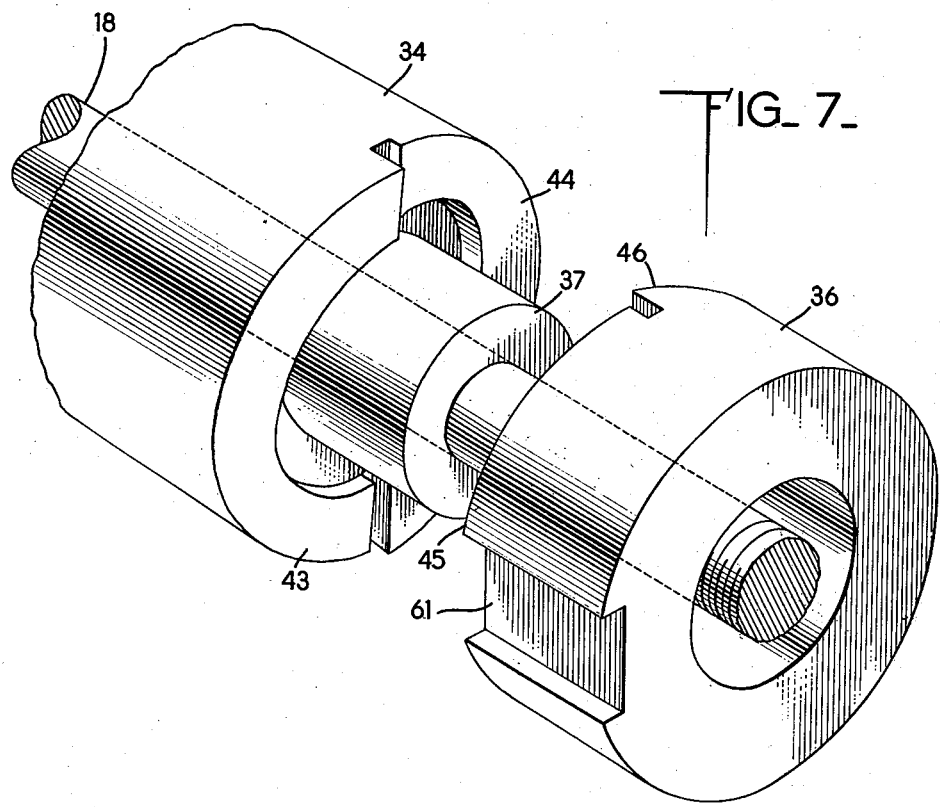
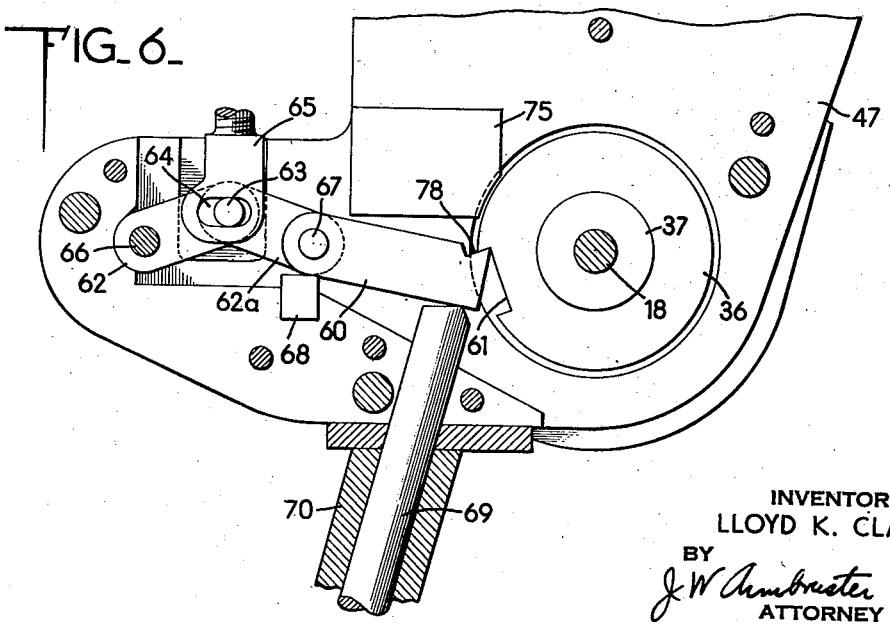

Patented Feb. 5, 1952

2,584,789

UNITED STATES PATENT OFFICE 2,584,789

AUTOMATIC CLAMPING DEVICE

Lloyd K. Clark, Owego, N. Y., assignor to International Business Machines Corporation, New York, N. Y., a corporation of New York Application March 7, 1950, Serial No. 148,094

5 Claims. (Cl. 101—4)

The present invention relates to milling machines of the kind wherein a matrix is employed for the purpose of generating type faces on the periphery of a circular blank or workpiece by reciprocating the matrix and rotating the workpiece in alternate directions whereby continuous pressing and rolling action is affected between the matrix and the workpiece. The invention is more particularly directed to a draw bar mechanism which cooperates with a suitable workholder to secure the workpiece during the type forming operation.

Machines of this general type have been in use for some time and it has been common practice to employ a draw bar rod which is mounted in the spindle of the machine and which supports an arbor. The arbor is secured in a socket of the spindle and both are rotatable with the rod. The workpiece is placed between one end of the rod and the face of the arbor and is secured by screwing a nut on the end of the rod to press the workpiece against the arbor. This practice necessitates stopping the machine when the work is changed, for a time long enough to unscrew and remove such nut, remove the finished type wheel, apply a new wheel blank, and replace and tighten up the nut.

In a type forming operation of the kind where the type characters are rolled into the periphery of a wheel blank it is quite important that the wheel blank be held very securely in order to obtain clear and accurate type characters. As a result it became necessary when inserting a new wheel blank on the rod to screw the nut by hand and then further tighten the nut by means of a wrench. Also when removing the type wheel at the end of a type rolling operation it became necessary to apply a wrench to the nut and then strike the wrench with a rather heavy hammer in order to loosen said nut. This was due to the fact that during the type rolling operation the metal in the wheel blank expands and increases the locking action between the nut and the related screw threads on the rod. The rolling operation itself takes approximately half a minute and since the replacement of the workpiece is therefore repeated at short intervals the added necessity of tightening and untightening the nut by means of a wrench and a hammer greatly increases the time required for rolling type wheels and adds considerably to the fatigue of the operator.

Accordingly it is the primary object of the invention to provide an improved automatic draw bar operating mechanism which will reduce the time and effort required in making exchange of wheel blanks during the operation of rolling type faces on type wheels.

It is a feature of the invention to provide a means whereby the operator will be required only to place the workpiece in the workholder and to screw the nut with a minimum of finger pressure to a position whereby said workpiece will be but loosely held and to have the additional required tightening of the workpiece automatically effected by the machine at the start of each new type rolling operation. Thus, it is a further object of the invention to provide an improved draw bar mechanism wherein a draw bar is automatically moved horizontally along its axis and in one direction at the start of each new machine operation causing a take up in slack between associated workholding members mounted on said draw bar which results in tightening the workpiece into position.

It is a further feature of the invention to provide means automatically called into operation at the end of each type rolling operation to relax the grip on the workpiece to its original state of looseness thereby enabling the operator to remove the workpiece by merely unscrewing the nut with a minimum of finger pressure. As a result it is a further object of the invention to provide an improved draw bar mechanism wherein a draw bar is automatically moved horizontally along its axis and in one direction at the end of each type rolling operation to cause the associated workholding members mounted on said draw bar to slacken their grip on the workpiece.

A still further object of the invention is to provide a novel control mechanism for effecting a shifting movement of the draw bar in one direction at the start of a new type rolling operation and for effecting movement of the draw bar in the opposite direction at the end of a type rolling operation.

Other objects of the invention will be pointed out in the following description and claims and illustrated in the accompanying drawings, which disclose, by way of example, the principle of the invention and the best mode, which has been contemplated, of applying that principle.

In the drawings:

Fig. 6 is a partial end view of the draw bar control mechanism showing the lock bolt about to be cammed free from the lock cam.

Fig. 7 is a perspective view showing the spindle cam and the lock cam disassembled from each other.

Figure 1:
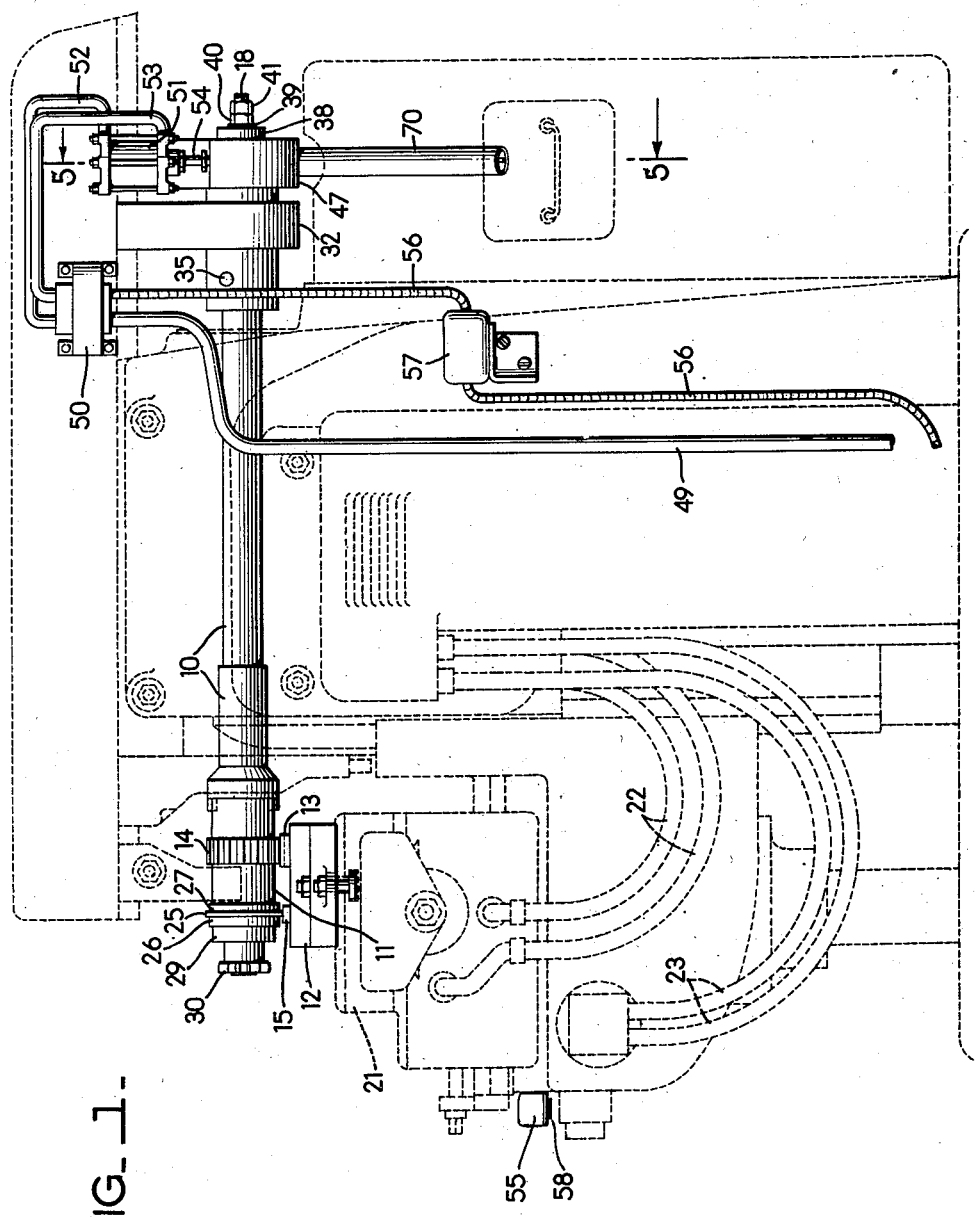
Fig. 1 is a view showing the outline of a side elevation of a standard milling machine with the standard part shapes shown in dotted lines and the new draw bar mechanism and associated parts shown in full lines.

The invention is illustrated in connection with a standard commercial milling machine and inasmuch as the provisions in such machine for reciprocating the horizontally moving bed having a matrix mounted thereon, rotating the workpiece, and feeding the bed and matrix to depth in the workpiece are all standard, and are not affected by the new invention here disclosed, I have limited the detailed showing of the drawings to those features only which are necessary to an explanation of the new steps and features, and for the rest have shown simply the external outlines of the machine.

By way of general explanation, it will be sufficient to say that 10 (Fig. 1) represents the rotatable machine spindle to which is attached a holding arbor 11; that 12 represents a support plate which is bolted to the top surface of the horizontally moving bed of the machine and that the bed is caused to reciprocate by a hydraulic pump arrangement which is a standard part of the machine; that a floating rack 13 is mounted on the support plate 12 and meshes with a gear 14 fixed to said arbor 11 thereby causing the arbor 11 and spindle 10 to rotate as the horizontally moving bed is reciprocated; and that said support plate 12 also supports a die rack or matrix 15 which is moved in either direction vertically for swaging pressure by means of a hydraulic pump arrangement acting upon said horizontally moving bed in a manner common to standard milling machines. It is not deemed necessary to further describe the various mechanisms in the milling machine which effect the above mentioned movements since these mechanisms are a minor part of the showing of the present invention and merely constitute a preferred mode for carrying out the principles of the invention.

Figure 3:
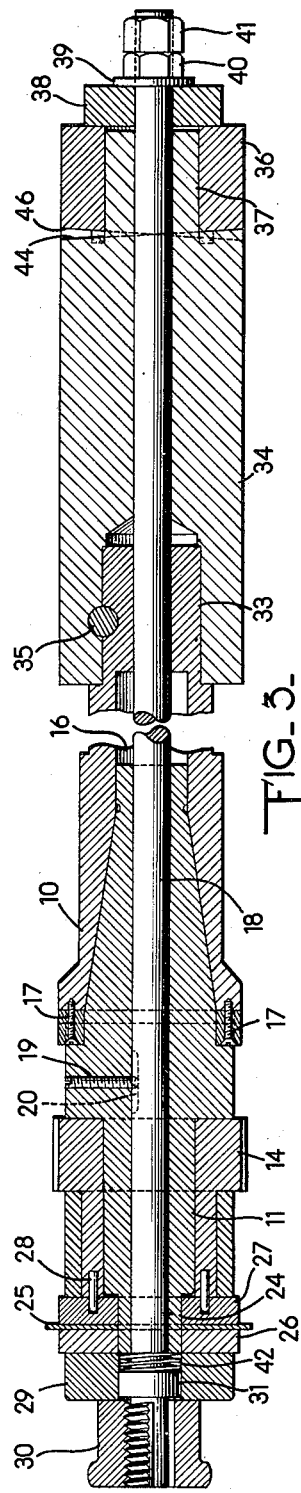
Fig. 3 is a sectional view taken on line 3—3 of Fig. 5 and showing the entire length of the draw bar with all the associated parts that are around it.

The construction of the draw bar mechanism can best be seen by referring to Figs. 1 and 3. The machine spindle 10 is rotatably mounted in the milling machine in the usual manner and extends all the way through the machine as shown in Fig. 1. A tapered hole 16 extends through a portion of said spindle 10 and is adapted to receive the tapered end of the arbor 11 as shown in Fig. 3. This arbor 11 is rigidly attached to the spindle 10 for rotation therewith by means of the screws 17 and both the arbor 11 and the spindle 10 are adapted to receive a draw bar 18. The draw bar 18 is slidably mounted within said arbor 11 and spindle 10 so that it may be reciprocated along the horizontal axis therein and the distance that said draw bar may be reciprocated is limited by means of a set screw 19 mounted in said arbor 11 and which extends into a groove 20 cut in said draw bar. The set screw 19 and groove 20 also serve as a means for making said draw bar 18 rotatable with said arbor 11 and spindle 10.

As was previously mentioned, in generating type about the periphery of a workpiece, the workpiece is rotated in alternate directions while in rolling contact with the matrix. Accordingly, there is provided a means for rotating the arbor 11 in alternate directions which comprises a gear 14 rigidly attached to said arbor 11 and in mesh with a floating rack 13 as shown in Fig. 1. The floating rack 13 is spring mounted in a support plate 12 which is in turn bolted to the top of the horizontally moving bed 21 of the machine. Standard commercial hydraulic pumps are provided within the machine which communicate a suitable working fluid through the tubings indicated at 22 and 23 in Fig. 1 to give the bed 21 horizontal reciprocating motion and vertical motion.

Referring to Fig. 1, it can be seen that the draw bar mechanism protrudes out from the front of the machine to facilitate the mounting of the workpiece thereon. As shown in Fig. 3, the arbor 11 has a shaft-like portion 24 on which is supported the workpiece 25 and a pair of holding face plates or collars 26 and 27. The collar 27 is loose axially on the shaft portion 24 but is in a fixed relation to the main part of the arbor 11 for rotation therewith by means of the pins 28. The workpiece 25 and collar 26 are also loosely mounted on said shaft portion 24 to facilitate loading and unloading of the same by the operator. A clamp collar 29 and a knob 30 are used by the operator to clamp the workpiece in position prior to running the machine. The clamp collar 29 fits loosely over a flange 31, which is an integral part of the draw bar 18, and is caused to abut against the collar 26 by the knob 30 screwed onto the threaded end portion of the draw bar. Knob 30 may be either a full nut, or of the quick fastening half nut type shown. Since the draw bar 18 automatically causes an additional force to be exerted against the collar 26 to effect a tighter grip on the workpiece, in a manner later described, it is only necessary that the operator turn the knob 30 a sufficient amount to take up the initial slack between the collars and the workpiece.

The opposite end of the draw bar mechanism protrudes from the rear of the machine as shown in Fig. 1 and is supported in a bearing support 32 attached to the machine. Referring to Fig. 3, the rear end of the spindle 10 has a projection 33 which is adapted to receive a spindle cam 34. The spindle cam 34 is loose with respect to the draw bar 18 but is fixed to the spindle 10 for rotation therewith by means of a pin 35. A lock cam 36 is mounted losely on a shaft-like projection 37 of the spindle cam 34 and is held thereon by means of a collar 38, a washer 39, a collar nut 40 and a lock nut 41 which are mounted on the end of the draw bar 18 as shown in Fig. 3. Also the cam face 46 of lock cam 36 is maintained against the cam face 44 of spindle cam 34 for cooperation therewith by means of a coil spring 42 which presses between the flange 31 of the draw bar and the front end portion 24 of arbor 11. As such, the spring 42 tends to push the draw bar 18 towards the front of the machine and the collar 38 will force the lock cam 36 against the cam face 44 of the spindle arm 34.

The configuration of the cam faces of said cams 34 and 36, which are of the face cam variety, may best be seen by referring to Fig.

7 which shows the rear portion of the draw bar 18 with collar 38, washer 39, collar nut 40 and lock nut 41 removed and the lock cam 36 disassembled from the shaft-like projection 37 of the spindle cam 34. The face of spindle cam 34 is split down the middle to form two spiral camming surfaces indicated as 43 and 44. The camming surfaces 43 and 44 are identical in lead of spiral and on each surface the lead of the spiral is in the same rotative direction, which looking at Fig. 7, would be clockwise. The face of lock cam 36 is also split down the middle and has two camming surfaces 45 and 46 opposite to but identical in lead of spiral to the surfaces 43 and 44. When the two cam faces are juxtaposed as shown in Fig. 3, the camming surfaces 45 and 46 are complementary to the camming surfaces 43 and 44. It follows then that if, for example, cam 36 is held against rotation but is capable of movement along its axis and cam 34 is not capable of movement along its axis but may be caused to rotate in the same direction as the lead of spiral on the face of cam 36, then upon relative movement a wedging action will result wherein the surfaces 43 and 44 on cam 34 will force the lock cam 36 along the projection 37 and towards the rear of the mechanism.

Referring to Fig. 3, it may be seen that as lock cam 36 moves towards the rear of the mechanism it will force the collar 38, washer 39, collar nut 40 and lock nut 41 to move in the same direction. Since the lock nut 41 is fixed to the draw bar 18, said draw bar will also move towards the rear of the mechanism, the camming force being greater than the opposing force of coil spring 42, and the knob 30 will exert additional pressure against the clamp collar 29 to cause the workpiece 25 to be clamped and rigidly held in position by the holding collars 26 and 27.

Conversely, it may be understood that if lock cam 36 be held against rotation and the spindle cam 34 be rotated in the opposite direction, i. e., in a rotative direction opposite to the lead of spiral of said lock cam 36, the wedging action previously described will be reversed and cam 36 will move back along the shaft-like projection 37 to its original position under the force of the coil spring 42 pressing against flange 31. Hence, the draw bar will be restored to its original position and the clamping grip exerted on the workpiece 25 by the various collars will be slackened.

Figure 4:
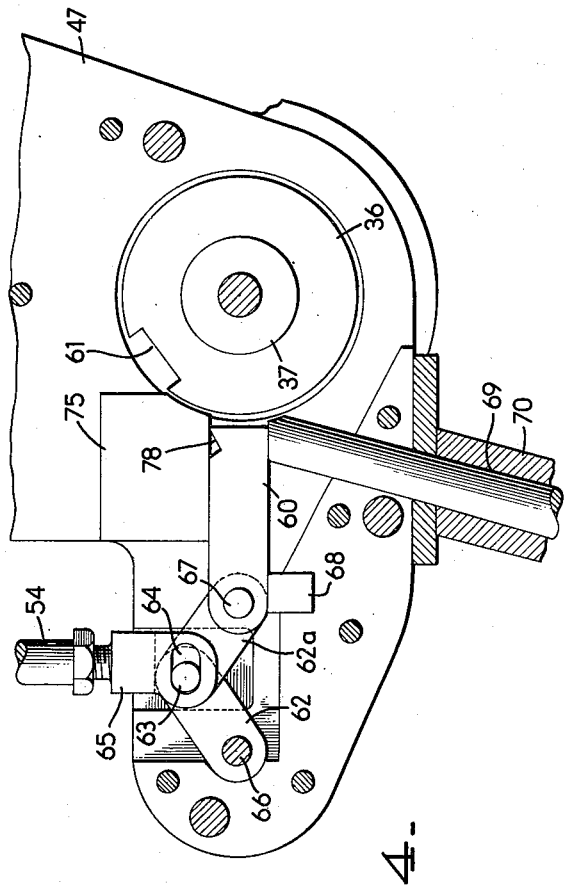
Fig. 4 is a partial end view of the draw bar control mechanism showing the lock bolt in the retracted position.
Figure 5:
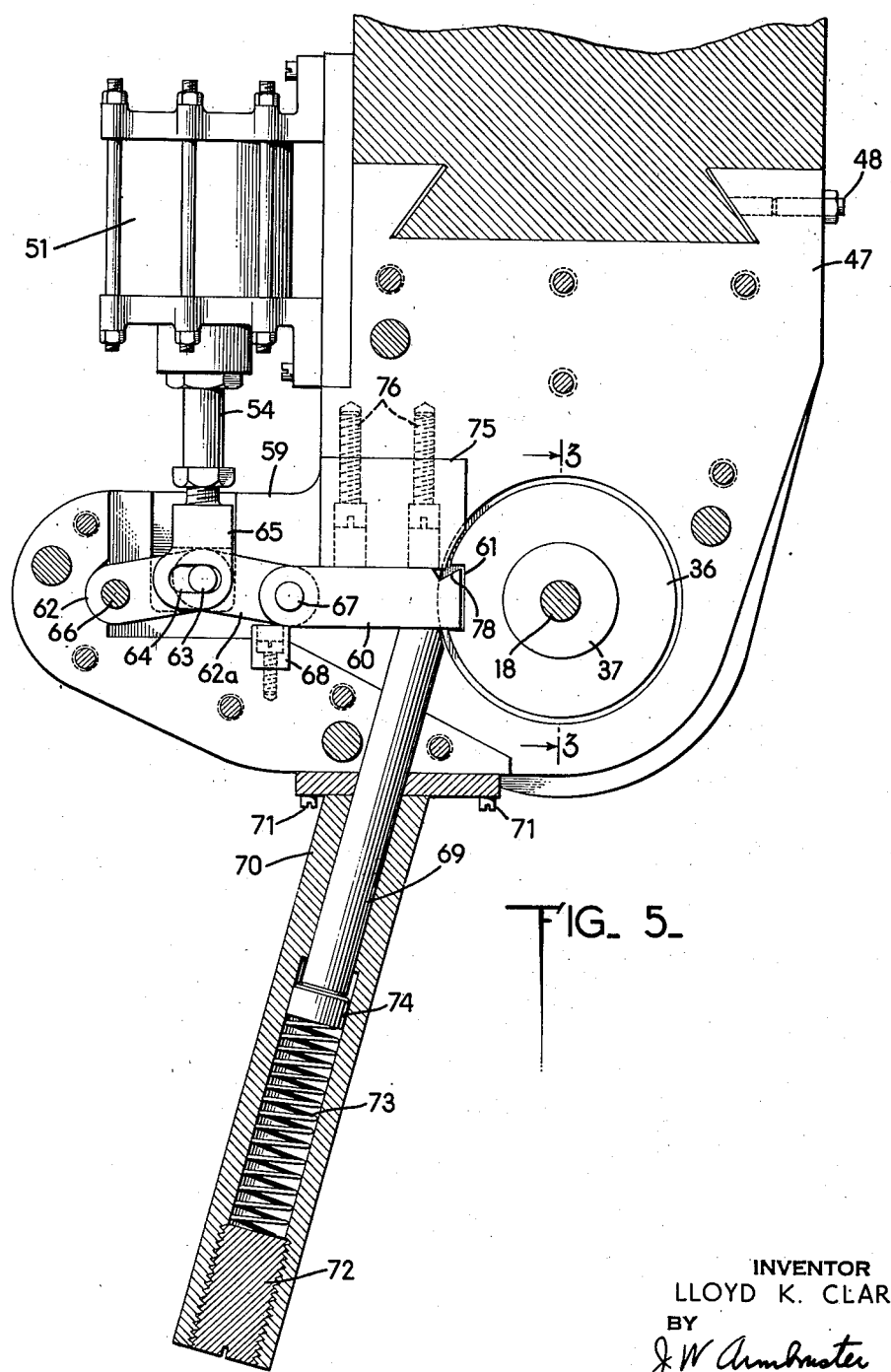
Fig. 5 is an end view of the draw bar control mechanism showing the lock bolt in the extended position.

In order to control the operation of spindle cam 34 and lock cam 36 to effect the movements of the draw bar 18 just described, there is provided a control mechanism as shown in Figs. 4, 5 and 6. The main portion of the control mechanism, which is one of the features of the present invention, is shown as being incorporated in a support block 47 dovetailed onto the frame of the milling machine and held in place by a bolt 48, Fig. 5. The support block 47 is in the extreme rear portion of the machine (Fig. 1) and houses the lock cam 36 (Figs. 3 and 4) with which said control mechanism coacts.

Figure 2:
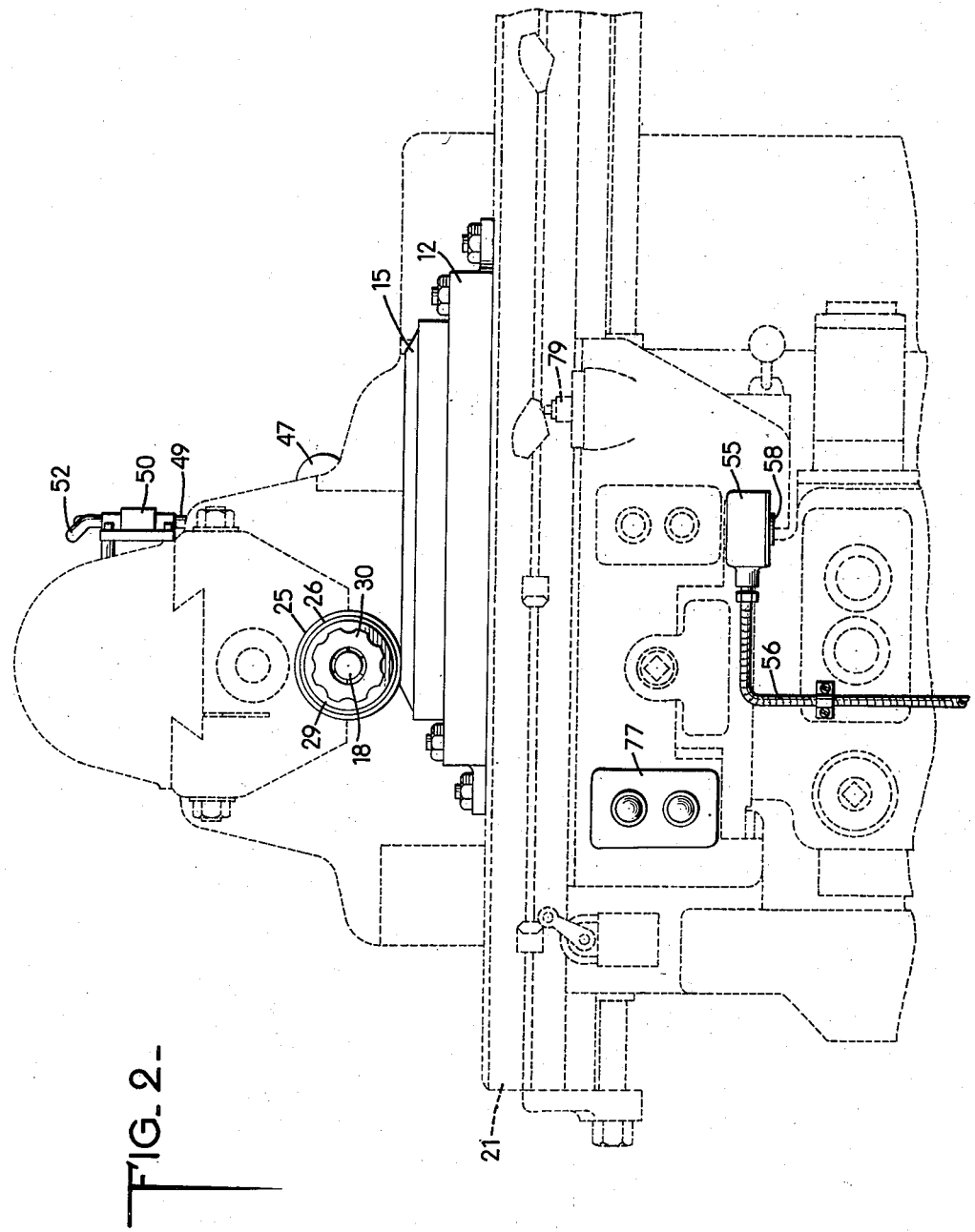
Fig. 2 is a view showing the outline of a front elevation of a standard milling machine with the standard part shapes shown in dotted lines and the new draw bar mechanism and associated parts shown in full lines.

The means provided for operating the control mechanism comprises standard commercial devices and need only be pointed out and not described in detail. Air under pressure is communicated from a suitable source through a tubing 49 (Fig. 1) and into a commercial solenoid operated air valve 50 mounted to the machine frame. The air is further communicated between the air valve 50 and an air cylinder 51 by means of the tubes 52 and 53, said air cylinder 51 being bolted to the side of the support block 47 and having a conventional plunger 54 which is connected to the control mechanism. The operator may control the movement of said plunger 54 by means of a standard electrical control switch 55 which is mounted on the front of the machine as shown in Fig. 2. Tubing 56 conducts power wiring from said switch 55 through a junction box 57 mounted on the side of the machine (Fig. 1) to the solenoid of the air valve 50.

When power is on the machine, the air valve 50 allows air through tube 53 to maintain plunger 54 in the raised position in the cylinder 51. When button 58 (Fig. 2) on switch 55 is depressed, the air valve 50 (Fig. 1) will switch the air pressure to tube 52 to cause the plunger 54 to be forced downward. Plunger 54 will be maintained in the lowered position as long as button 58 is held depressed and can be returned to its raised position upon the release of said button.

The operating parts of the control mechanism are housed within a chamber 59 (Fig. 5) of the support block 47 and function particularly to control the rotation of the lock cam 36. This is done by actuating a lock bolt 60 and causing the same to seat into a notch 61 in the lock cam 36 to prevent the rotation thereof and then later retract the lock bolt 60 to free said cam 36 for rotation. A toggle mechanism is provided for actuating the bolt 60. The toggle comprises a pair of links 62 and 62a pivotally joined end to end by a stud 63. The stud 63 fits into an elongated slot 64 of an adapter 65 which is connected to the plunger 54. The other end of link 62 is pivotally mounted on a short shaft 66 fixed to the side plates of the support block 47 while the free end of link 62a is pivotally attached to one end of the bolt 60 by a stud 67. It follows then that with the bolt 60 in a retracted position as shown in Fig. 4, a downward movement of the plunger 54 will tend to straighten the toggle mechanism and force the bolt 60 to seat in notch 61 as shown in Fig. 5. Conversely, an upward movement of the plunger 54 will retract the bolt 60 out of notch 61. A block 68 attached to the bottom of chamber 59 provides a bearing surface for the joined ends of link 62a and bolt 60.

The free end of bolt 60 is supported in a horizontal position by a spring plunger 69 mounted in a spring housing unit 70 attached to the under side of the support block 47 by the bolts 71. A screw plug 72 secured in the lower end of the spring housing unit 70 acts as a supporting member for a spring 73 which exerts an upward pressure through spring pad 74 to the bottom end of spring plunger 69. The upward motion of lock bolt 60 is limited by a backup block 75, which is permanently positioned to the top of chamber 59 by screws 76.

The operation of the invention is as follows:

The type wheel blank 25 (Fig. 1) is mounted on the arbor and secured loosely against the collar 27 by manually turning the knob 30 a couple of times with the collars 26 and 29 interposed. The lock cam 36 (Fig. 5) is then locked against rotation as previously described by depressing button 58 (Fig. 2) on switch 55. While holding said button 58 depressed, the operator starts the machine by actuating the start switch indicated at 77 in Fig. 2, thereby setting into motion the horizontally moving bed 21. The hydraulic pumps in the machine operate to start the vertical movement of the bed 21 to feed the matrix 15 against the periphery of the wheel blank and at the same time cause said bed 21 to reciprocate horizontally, first to the left and then to the right (looking at the front of the machine as in Fig. 2). Well-known means are also provided on the machine which can be set by the operator to control the number of horizontal passes that bed 21 will make and also the amount of vertical movement required depending upon the particular type rolling operation involved.

As bed 21 (Fig. 1) starts its initial pass toward the left, gear 14 will cause the arbor 11 and spindle cam 34 to commence to rotate in a counterclockwise direction (Fig. 7) which is the same direction as the lead of spiral of the camming surfaces on lock cam 36. Only a few degrees of rotation of cam 34 are all that is necessary to force lock cam 36 a sufficient distance along projection 37 to cause a take-up of the looseness between the members along the draw bar 18 and rigidly clamp the type wheel blank 25 in position. The lead of spiral of the camming surfaces on cams 34 and 36 is such that as cam 34 continues to rotate further, a binding action occurs between said cams and the pressure exerted by the interacting cam surfaces will increase sufficiently to overcome the pressure exerted against bolt 60 (Fig. 5) by spring plunger 69. As a result, the lock cam 36 will commence to rotate clockwise with cam 34, and the top shoulder of notch 61 acting against the surface 78 of a groove in the end of the bolt 60 will cause said bolt 60 to pivot in a clockwise direction, as shown in Fig. 6, to free said lock cam 36 for rotation. At this point the operator releases button 58 to maintain bolt 60 free from cam 36 as shown in Fig. 4. It is to be understood that the action just described is completed in the matter of a few seconds and while the bed 21 is still making its initial pass to the left.

As the bed 21 nears the end of its travel to the left a conventional limit switch indicated at 79 on Fig. 2 will be actuated in the usual manner to cause bed 21 to reverse its direction of movement and move to the right. The spindle cam 34 (Fig. 7) will now rotate in a clockwise direction and the binding action between said spindle cam 34 and the lock cam 36 is sufficient to cause said lock cam 36 to rotate clockwise with the spindle cam 34. When bed 21 nears the end of its movement to the right, the limit switch 79 will again be actuated causing the motion of said bed to reverse and accordingly reverse the rotation of cams 34 and 36. The bed 21 will reciprocate in this fashion to complete as many passes as the machine is set for. One pass is considered to have been made when the bed completes its travel in one direction.

Assuming that the operator has set the machine to make a total of six passes, at the completion of the fifth or next to the last pass, controls within the machine will cause the bed 21 to gradually feed downward. At this point the operator depresses button 58 to lock cam 36 against any further rotation as previously described. The lock cam 36 will be rotating counterclockwise (looking at the front of the machine) and bolt 60 will strike the periphery of said cam and seat in the notch 61 (Fig. 5) as it comes around clockwise into position. The lock cam 36 will be stopped and held in a stationary position because bolt 60 will be prevented by lock 75 from taking any upward travel. The spindle cam 34 (Fig. 7) continues to rotate clockwise for approximately 30° to 45°, during which time bed 21 will have completed its movement to the right and the machine will stop. Since the spindle cam 34 was last rotating in a direction opposite to the lead of spiral on the surfaces of cam 36, the draw bar 18 (Fig. 3) will move towards the front of the machine under the force of coil spring 42, and the grip exerted on the type wheel blank 25 by the various collars will be slackened. Meanwhile the bed 21 (Fig. 2) will have completed its downward movement, thus freeing the workpiece 25 from the matrix 15. The knob 30 can be readily unscrewed merely by finger pressure, the finished type wheel removed and a new type wheel blank inserted for the next operation.

Collar nut 40 and lock nut 41 may be adjusted on the draw bar 18 for different production runs that may involve type wheel blanks of different thicknesses and also to time the interaction of cams 34 and 36. Where a production run involves many type wheel blanks and it only requires around 6 or 8 passes of the machine to completely engrave each wheel it can be readily understood that use of the devices of present invention will result in a tremendous saving in time and effort.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine tool, a rotatable member, a draw bar adapted for axial movement within said member, a pair of juxtaposed face plates on said member, one of said face plates being attached thereto and the other free for axial movement thereon, limit means secured on said draw bar to maintain said face plates juxtaposed, a second limit means secured on said draw bar and spaced apart from said first means, a pair of complementary cams interposed between said limit means, one of said cams being attached to said member, said cams adapted upon rotation to cam said second limit means to cause said draw bar and said first limit means to apply a force against said face plates and member and upon a reversal of rotation to release said force, and control means adapted to lock one of said cams against rotation.

2. A machine tool of the kind set forth in claim 1 wherein said control means comprises a mechanism, a bolt attached to said mechanism and capable of axial movement, a fixed plate, a member adapted to support said bolt against said fixed plate, and means for operating said mechanism to cause said bolt to move between said fixed plate and member to lock one of said cams against rotation.

3. In a machine tool, a rotatable member, a draw bar adapted for axial movement within said member, a pair of juxtaposed face plates on said member, one of said face plates being attached thereto and the other free for axial movement thereon, limit means secured on said draw bar to maintain said face plates juxtaposed, a second limit means secured on said draw bar and spaced apart from said first means, a pair of complementary cams interposed between said limit means, control means adapted to lock one of said cams against rotation, means to rotate said second cam when said first cam is locked to cam said second limit means to cause said draw bar and said first limit means to apply a force against said face plates and member, yieldable means included in said control means and operable by a predetermined pressure resulting from the interaction of said cams to allow said first cam to free itself for rotation with said second cam and thereby maintain said force applied against said face plates, and means to operate said control means when said cams are rotating together in a reverse direction to lock said first cam to release the force applied against said face plates.

4. In a machine tool for operating on a workpiece, an arbor carrying said workpiece, a draw bar adapted for axial movement within said arbor, a pair of juxtaposed face plates on said arbor and on opposite sides of said workpiece, one of said face plates being attached thereto and the other free for axial movement thereon, limit means adjustably secured on said draw bar to maintain said face plates and workpiece juxtaposed, a second limit means adjustably secured on said draw bar and spaced apart from said first means, a pair of complementary face cams interposed between said limit means, one of said cams being attached to said arbor, said cams adapted upon rotation to cam said second limit means to cause said draw bar and said first limit means to apply a force against said face plates, workpiece and arbor to clamp said workpiece thereon and upon a reversal of rotation to release said force, and control means adapted to lock one of said cams against rotation to cause relative movement between the cams and a resultant camming action.

5. A machine tool as set forth in claim 4 wherein said control means comprises a toggle mechanism, a bolt attached to said mechanism and capable of axial movement, a fixed plate, a flexible member adapted to support said bolt against said fixed plate, and means for operating said mechanism to cause said bolt to move between said fixed plate and said member to lock one of said cams positively against rotation in one direction and to permit movement of said one cam in the other direction only after it has exerted a camming and clamping force to the draw bar through wedging engagement of the two face cams.

LLOYD K. CLARK.

REFERENCES CITED

The following references are of record in the file of this patent:

UNITED STATES PATENTS

| Number | Name | Date |
|---|---|---|
| 95,344 | Hill | Sept. 28, 1869 |
| 262,369 | Cameron | Aug. 8, 1882 |
| 998,274 | Bredell | July 18, 1911 |
| 1,065,951 | Magrane | July 1, 1913 |
| 1,723,785 | Johnson | Aug. 6, 1925 |
| 1,789,892 | Allatt | Jan. 20, 1931 |
| 1,796,387 | Mountford | Mar. 17, 1931 |
| 2,038,759 | Roberts | Apr. 28, 1936 |